United States Patent [19]

Hatano et al.

[11] 3,761,918

[45] Sept. 25, 1973

[54] CONCURRENT ENTRY PREVENTING SYSTEM

[75] Inventors: Isao Hatano; Akira Nagano, both of Otokuni-gun, Kyoto-fu; Kazuaki Urasaki, Fushimi-ku, Kyoto-shi, Kuoto-fu, all of Japan

[73] Assignee: Omron Tateisi Electronics Co., Kyoto, Japan

[22] Filed: Mar. 10, 1971

[21] Appl. No.: 122,666

[30] Foreign Application Priority Data

Mar. 10, 1970 Japan .................................. 45/20302

[52] U.S. Cl. .................... 340/365 E, 340/146.1 AB

[51] Int. Cl. ............................................. H04q 3/00

[58] Field of Search ..................... 340/365, 347 DD, 340/146.1 AB

[56] References Cited

UNITED STATES PATENTS 2,603,746 7/1952 Burkhart et al. ........................ 328/94
2,718,633 9/1955 Fennessy ...................... 340/347 DD
2,737,647 3/1956 Oliwa ........................... 340/347 DD
3,483,553 12/1969 Blankenbaker ..................... 340/365
2,735,091 2/1956 Burkhart ...................... 340/347 DD

*Primary Examiner*—John W. Caldwell
*Assistant Examiner*—Robert J. Mooney
*Attorney*—Craig, Antonelli, Stewart & Hill

[57] ABSTRACT

A concurrent entry preventing system for use in electronic calculating machines capable of preventing the erroneous arithmetic operation performed by the calculating machine. To this end, means is provided for yielding a warning signal indicative of the fact that two or more character keys are concurrently operated in a wrong course. This warning signal comprises the logical product of a signal indicative of operation of one of such characters by a signal indicative of operation of one or more of the remaining character keys, if the both character keys are concurrently operated.

13 Claims, 3 Drawing Figures

INVENTORS

ISAO HATANO, AKIRA NAGANO
AND KAZUAKI URASAKI

BY Craig, Antonelli, Stewart & Hill
ATTORNEYS

INVENTORS
ISAO HATANO, AKIRA NAGANO
AND KAZUAKI URASAKI

BY Craig, Antonelli, Stewart & Hill
ATTORNEYS

CONCURRENT ENTRY PREVENTING SYSTEM

The present invention relates to an electronic system particularly adaptable in an electronic calculator for yielding an error warning signal which may be utilized to operate any type of warning device or to interrupt the arithmetic operation of the caluculator when two different character keys disposed on a keyboard of the calculator are erroneously operated at the same time.

Before the description proceeds, it is to be noted that such a system for yielding a warning signal indicative of an error in operation , that takes place in such a manner that two different character keys are erroneously operated at the same time, is hereinafter referred to as a concurrent entry preventing system.

It has been often experienced that, in a typewriter or the like provided on a keyboard with a plurality of character keys, when two or more keys are concurrently operated, type bars associated with such keys are jammed resulting in a misprint. Similarly, the same error may occur in any type of calculating machine wherein, when two keys are concurrently operated, the display device will not read out an input exactly or the intended process of arithmetic operation will be confused.

To prevent the above mentioned inconvenience, it is necessary to provide means for interrupting the presently proceeding arithmetic operation of for warning the operator of the fact that he has made a slip in operating the keyboard.

Accordingly, the present invention has for an object the provision of a concurrent entry preventing system of the character above referred to which is capable of yielding a warning signal when two or more adjacent keys are erroneously operated at the same time.

It is to be noted that, although the present invention is directed to the provision of a concurrent entry preventing system for yielding a warning signal, this warning signal may be utilized in any known manner, for example, to light a warning lamp, to operate a warning buzzer or to interrupt a presently proceeding arithmetic operation, with a suitable circuit device necessitated for any of these purposes.

According to a preferred form of the present invention, the warning signal can be obtained in the form of a logical product of a signal indicative of the operation of one character key by another signal indicative of the operation of the other character key positioned adjacent to the first mentioned key.

Figure 1:
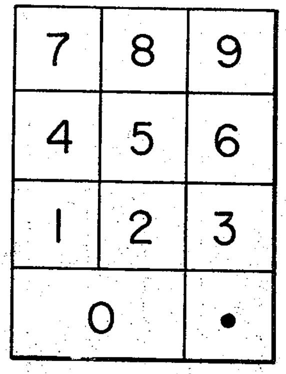
Figure 2:
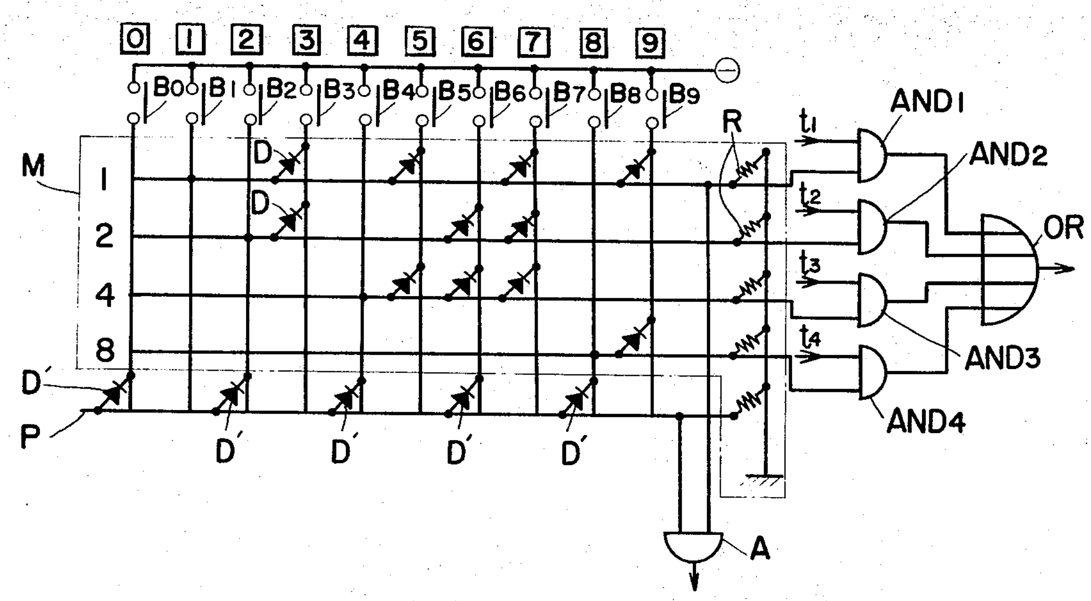
Figure 3:
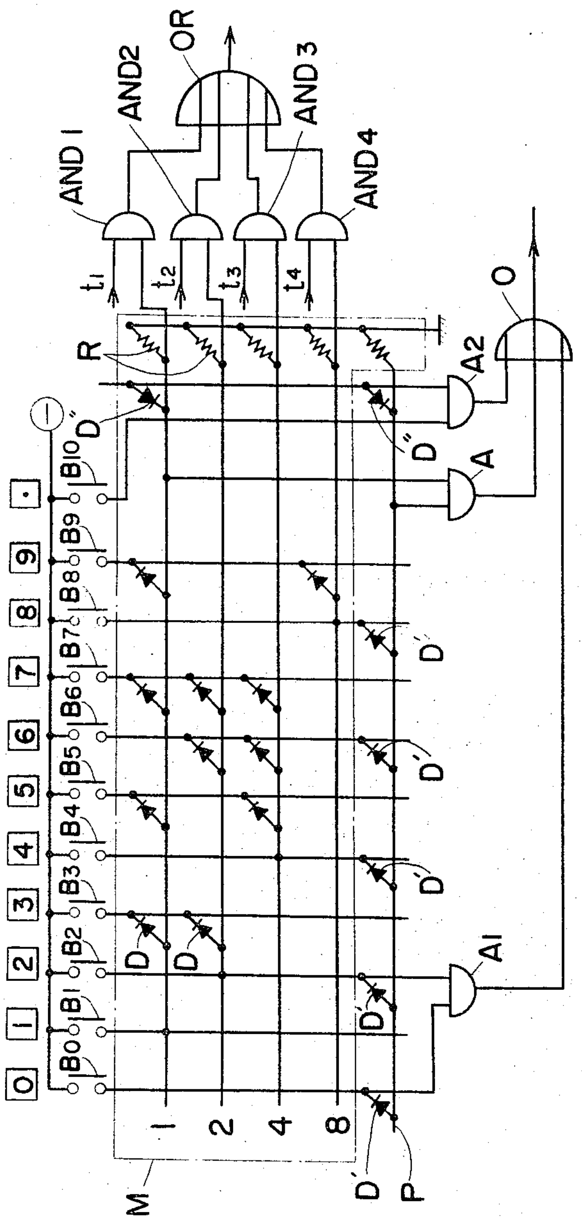

These and other object and features of the present invention will become more apparent from the following description taken in conjunction with preferred embodiments thereof with reference to the attached drawings, in which;

FIG. 1 is a schematic diagram showing one exemplary arrangement of character keys on the keyboard, said character keys bearing (0) to (9) figures and a decimal point, FIG. 2 is a matrix diagram of the system embodying the present invention, and FIG. 3 is a matrix diagram of the system of the present invention in another preferred embodiment.

It is assumed that the calculating machine to which the present invention as will be hereinafter described in connection with preferred embodiments thereof can be advantageously applied has a keyboard arrangement as shown in FIG. 1. In other words, in the lowermost row from left to right, the (0) figure key is followed by the decimal point key and, from the second row to the fourth or topmost row, the (1) through (9) figure keys are disposed in such a manner that the odd figure is followed by the even figure in either of the horizontal or vertical directions.

In this keyboard arrangement as shown in FIG. 1, it may be possibly said that odd and even figure keys are concurrently operated more frequently than odd and odd or even and even figure keys, except for the (0) figure key and the decimal point key.

In FIG. 2, the concurrent entry preventing system according to the present invention is shown which is capable of yielding a warning signal particularly when the odd and even figure keys are concurrently operated. In this preferred embodiment shown in FIG. 2, a plurality of key contacts $B_0$ to $B_9$ are disposed in association with the respective figure keys, each of which being adapted to be closed upon operation of the corresponding figure key. Reference character M indicated a diode matrix, D and D' indicate diodes and R indicates resistors. When one of the figure keys is operated, an input signal representative of a decimal digit corresponding to the operated figure key is converted into binary coded signals by the matrix M which are in turn fed to "and" circuits $AND_1$ and $AND_4$, respectively. Outputs of these "and" circuits, which are, respectively, logical products of these binary coded signals and clock pulses $t_1$ to $t_4$, are adapted to be fed to an "or" circuit OR from which bit pulses can be obtained.

As will be clearly understood from FIG. 2, if any of the odd figure keys is operated because of the diodes D connected to the 1 line and the terminals of contacts $B_3$ , $B_5$ $B_7$,and $B_9$ and the direct connection of line 1 and the terminal of key contact $B_1$ , a high level signal can be produced on the 1° or 2° 's output line of the diode matrix M. In this arrangement, an additional output line P is provided according to the teachings of the present invention which is connected through respective diodes D' with key contacts $B_0$ , $B_2$ , $B_4$,$B_6$ and $B_8$ associated with respective even figure keys, so that a high level signal can be produced on the output line P when any of the even figure keys is operated.

The two high level signals as hereinbefore described are adapted to be fed to respective input terminals of an "and" gate A, the output of which being a warning signal which may be utilized to indicate a slip in operation.

It is to be noted that, in the instance as shown in FIG. 2, the numerical figure (0) is construed as an even number.

In the concurrent entry preventing system of the present invention as hereinbefore described, one high level signal can be always produced on the 2°'s output line of the diode matrix M upon closure of any of the odd figure key contacts while another high level signal can be produced on the output line P upon closure of any of the even figure key contacts. Accordingly, if adjacently disposed odd and even figure keys are concurrently operated erroneously,the "and" gate A will receive two high level signals, one from the 2°'s output line of the diode matrix M and the other from the output line P and then produce a warning signal in the form of the logical product of these high level signals. Thus, it will be understood that the output of the "and" gate A, i.e., the warning signal,can be utilized to indicate an error in operation.

In FIG. 3, the concurrent entry preventing system according to the present invention is shown which is capable of yielding a warning signal particularly when the odd and even figure keys, the decimal point key and any of the figure keys or the (0) and (2) figure keys are concurrently operated. It is to be noted that like parts shown in FIG. 2 are indicated by like reference characters in the embodiment of the present invention shown in FIG. 3 and that the details of like parts which have been described in conjunction with the first mentioned embodiment and which are also shown in FIG. 3 are omitted for the sake of brevity.

In the embodiment shown in FIG. 3, two additional "and" gates $A_1$ and $A_2$ are provided, one of which, i.e., $A_1$ has a pair of input terminals respectively for receiving a high level signal indicative of the operation of the (0) figure key and another high level signal indicative of the operation of the (2) figure key positioned on the keyboard adjacent to said (0) figure key. The other additional "and" gate $A_2$ has a pair of input terminals, respectively, for receiving a high level signal indicative of the operation of the decimal point key and another signal indicative of the operation of any one of the figure keys. To enable the signal to be applied to the corresponding input terminal of the "and" gate $A_2$ when any one of the figure key is operated, said corresponding terminal is connected with the $2^0$'s output line of the diode matrix M and the output line P through a pair of diodes D'', respectively, as clearly shown.

The outputs of these three "and" gates A, $A_1$ and $A_2$ are adapted to be fed to an "or" gate 0 from which the warning signal can be obtained in the form of the logical sum of these output signals from the gates A, $A_1$ and $A_2$.

In the concurrent entry preventing system of the present invention as hereinbefore described with reference to FIG. 3, if adjacently disposed odd and even figure keys are concurrently operated erroneously, the "and" gate A will produce a signal in the same manner as hereinbefore described in conjunction with the first embodiment of the present invention with reference to FIG. 2. However, this signal from the gate A is fed to the "or" gate 0 which in turn issues a warning signal which may be employed to indicate an error in operation.

If the (0) and (2) figure keys are concurrently operated, the corresponding key contacts $B_0$ and $B_2$ will be closed at the same time to generate respective output signals which are in turn fed to the "and" gate $A_1$. The output of said gate $A_1$ is then fed to the "or" gate 0 from which a warning signal indicative of an error in operation can be obtained.

Similarly, if the decimal point key and any one of the figure keys are concurrently operated, the "and" gate $A_2$ will produce a signal in a similar manner as hereinabove described which is in turn fed to the "or" gate 0 to produce the warning signal.

Although the present invention has been fully disclosed in conjunction with the preferred embodiments thereof, various modifications and changes are apparent to those skilled in the art. For example, by modifying the arrangement of the system, a warning signal indicative of the fact that three or more keys are concurrently operated in a wrong course can be obtained. In addition, the system of the present invention can be applied in any other instruments than the electronic calculating machine which is hereinbefore employed for the sole purpose of description of the present invention.

We claim:

1. A concurrent entry preventing systemfor use in an electronic calculating machine comprising a keyboard having a plurality of figure keys corresponding to the decimal digits (1) to (9) arranged on said keyboard in such a manner that, in the lowermost row from left to right, the (1) to (3) figure keys are positioned; in the second row from left to right, the (4) to (6) figure keys are positioned; and in the third or topmost row from left to right, the (7) to (9) figure keys are positioned, a plurality of key contacts operatively associated with said figure keys, and means for yielding the logical product of an output signal indicative of operation of one of said figure keys bearing the odd number and an output signal indicative of operation of the other one of said figure keys bearing the even number, said logical product from said means being capable of indicating through a suitable circuit device the fact that two or more figure keys are concurrently operated erroneously.

2. A concurrent entry preventing system according to claim 1, wherein said figure keys further include a (0) figure key disposed on said keyboard at one side of the square area occupied by said (1) to (9) figure keys, said (0) figure key being construed as included in the even numbered figure keys.

3. A concurrent entry preventing system for use in an electronic calculating machine comprising a keyboard having a plurality of figure keys corresponding to the decimal digits (1) to (9) arranged on said keyboard in such a manner that, in the lowermost row from left to right, the (1) to (3) figure keys are positioned; in the second row from left to right, the (4) to (6) figure keys are positioned; and in the third or topmost row from left to right, the (7) to (9) figure keys are positioned, and a decimal point (.) key, a plurality of key contacts operatively associated with said figure keys and said decimal point key, means for yielding the logical product of an output signal indicative of operation of one of said figure keys bearing the odd number and an output signal indicative of operation of the other one of said figure keys bearing the even number, and means for yielding the logical product of an output signal indicative of operation of one of said figure keys and an output signal indicative of operation of the decimal point key, any of said two logical products from said both means being capable of indicating through a suitable circuit device the fact that at least one of said figure keys and the decimal point key or two or more of said figure keys are concurrently operated erroneously.

4. A concurrent entry preventing system for use in an electronic calculating machine comprising a keyboard having a plurality of figure keys corresponding to the decimal digits (1) to (9) arranged on said keyboard in such a manner that, in the lowermost row from left to right, the (1) to (3) figure keys are positioned; in the second row from left to right, the (4) to (6) figure keys are positioned; and in the third or topmost row from left to right, the (7) to (9) figure keys are positioned, a decimal point key and a (0) figure key positioned on the keyboard adjacent to said decimal point key immediately below said lowermost row, a first means for yielding the logical product of an output signal indicative of operation of one of said figure keys bearing the odd number and an output signal indicative of operation of the other one of said figure keys bearing the even number including (0), and a second means for yielding the logical product of an output signal indicative of operation of one of said figure keys and an output signal indicative of operation of the decimal point key, any of said two logical products from said first and second means being capable of indicating through a suitable circuit device the fact that at least one of said figure keys and the decimal point key or two or more of said figure keys are concurrently operated in a wrong course.

5. A concurrent entry preventing apparatus comprising:

a keyboard having a plurality of figure keys;

a plurality of key switches, each including terminals and a contact, coupled to said plurality of figure keys, for providing an electric potential at one of the terminals thereof upon activation of one of said figure keys; and means, coupled to each of said key switches, for generating an output signal representative of the logical product of the potentials provided by more than one of said key switches in response to the simultaneous activation of more than one of said figure keys, said plurality of figure keys comprising a first identifiable set of figure keys and a second identifiable set of figure keys, said output signal generating means including means, responsive to the simultaneous activation of one of the keys in said first set with one of the keys in said second set, for generating said output signal.

6. An apparatus according to claim 5, wherein said output signal generating means comprises a diode matrix, having a pair of orthogonal connection branches, one orthogonal branch of which is connected to said key switches, and the other orthogonal branch of which is connected to a first reference potential.

7. An apparatus according to claim 6, wherein said output signal generating means further comprises a first AND gate having a pair of inputs, a first of which is connected to each key switch of said first set and the second of which is connected to each key switch of said second set.

8. An apparatus according to claim 7, further including a plurality of reduction AND gates, respectively connected to one of said orthogonal branches and one of the inputs of each of which being connected to a source of timing signals, for partially energizing each of said reduction AND gates in response to the application of said timing signals, and whose outputs are connected to a OR gate for logically combining the outputs of each of said reduction AND gates.

9. An apparatus according to claim 5, wherein said plurality of figure keys comprises first and second additional figure keys separate from said first and second sets of figure keys and wherein said output signal generating means further comprises means, responsive to the simultaneous activation of one of the figure keys in one of said first and second sets and one of the figure keys of one of said first and second additional keys, for generating said output signal.

10. An apparatus according to claim 9, wherein said output signal generating means comprises a diode matrix, having a pair of orthogonal connection branches, one orthogonal branch of which is connected to said key switches, and the other orthogonal branch of which is connected to a source of reference potential.

11. An apparatus according to claim 10, wherein said output signal generating means further comprises a first AND gate having a pair of inputs, a first of which is connected to each key switch of said first set and the second of which is connected to each key switch of said second set, a second AND gate, having a pair of inputs, a first of which is connected to said first additional key switch and the second of which is connected to one key switch of one of said sets, a third AND gate, having a pair of inputs, a first of which is connected to each key switch of each of said sets and a second of which is connected to said second additional key switch, and means for logically combining the outputs of each of said first, second and third AND gates.

12. An apparatus according to claim 11, further including a plurality of reduction AND gates, respectively connected to one of said orthogonal branches and each of which is connected to a source of timing signals for partially energizing each of said reduction AND gates in response to the application of said timing signal, and an output OR gate for logicallly combining the outputs of each of said reduction AND gates.

13. An apparatus according to claim 12, further comprising a key board, on which said plurality of keys are arranged, said first and second sets of keys being arranged in alternate orthogonal relationship with respect to each other and said additional figure keys being arranged immediately adjacent with respect to each other and said sets of keys.

* * * * *